United States Patent
Pardo

(10) Patent No.: US 10,343,917 B2
(45) Date of Patent: Jul. 9, 2019

(54) METHOD AND FACILITY FOR DRYING BY MEANS OF HYDROTHERMAL CARBONIZATION AND FILTERING

(71) Applicant: SUEZ INTERNATIONAL, Paris la Defense (FR)

(72) Inventor: Pierre Emmanuel Pardo, Orsay (FR)

(73) Assignees: SUEZ INTERNATIONAL, Paris la Defense (FR); TERRANOVA ENERGY GMBH, Dusseldorf (DE)

(*) Notice: Subject to any disclaimer, the term of this patent is extended or adjusted under 35 U.S.C. 154(b) by 349 days.

(21) Appl. No.: 15/324,918

(22) PCT Filed: Apr. 18, 2016

(86) PCT No.: PCT/IB2016/052204
§ 371 (c)(1),
(2) Date: Jan. 9, 2017

(87) PCT Pub. No.: WO2016/170464
PCT Pub. Date: Oct. 27, 2016

(65) Prior Publication Data
US 2018/0179063 A1    Jun. 28, 2018

(30) Foreign Application Priority Data

Apr. 20, 2015  (FR) .................................. 15 53500

(51) Int. Cl.
*F26B 7/00*   (2006.01)
*F26B 1/00*   (2006.01)
(Continued)

(52) U.S. Cl.
CPC ............ *C01B 32/05* (2017.08); *C02F 11/122* (2013.01); *C02F 11/18* (2013.01); *C10L 5/447* (2013.01);
(Continued)

(58) Field of Classification Search
CPC .......... F26B 3/02; F26B 25/22; F26B 23/002; F26B 2200/18; F26B 7/00; F26B 1/00; F26B 23/004
See application file for complete search history.

(56) References Cited

U.S. PATENT DOCUMENTS 4,974,335 A  *  12/1990  Bege ........................ C02F 11/12
                                                    34/424
5,557,873 A  *   9/1996  Lynam ..................... C02F 11/14
                                                    34/379
(Continued)

FOREIGN PATENT DOCUMENTS

| DE | 10 2011 055 986 A1 | 6/2013 |
| DE | 10 2013 013 724 A1 | 2/2015 |
| WO | 98/25684 A1 | 6/1998 |
| WO | 2004/024290 A1 | 3/2004 |
| WO | 2014/178028 A1 | 11/2014 |
| WO | 2015/008219 A1 | 1/2015 |

OTHER PUBLICATIONS

International Search Report, dated Jul. 26, 2016, from corresponding PCT Application.

*Primary Examiner* — Gregory A Wilson
(74) *Attorney, Agent, or Firm* — Young & Thompson

(57) ABSTRACT

The present invention relates to the field of heat treatment of a product to be dehydrated, such as sludge from a waste water treatment process. The present invention relates more particularly to a method and to a facility for drying such a product, making it possible to implement a hydrothermal carbonization operation on reactor 1 followed by a filtering and drying operation, preferably on a heating filter press 6. In order to dry said product in the heating filter press 6, a heat-transfer fluid from a heat exchanger 2 is made to flow in said heating filter press. The heat exchanger 2 is arranged so as to transfer, to the heat-transfer fluid, at least some of the heat contained in the product to be dehydrated that is output from the reactor 1.

20 Claims, 1 Drawing Sheet

(51) Int. Cl.
    *C01B 32/05*     (2017.01)
    *C10L 5/44*     (2006.01)
    *C10L 5/46*     (2006.01)
    *F26B 5/14*     (2006.01)
    *C02F 11/122*     (2019.01)
    *C02F 11/18*     (2006.01)
    *F26B 3/02*     (2006.01)

(52) U.S. Cl.
    CPC ............... *C10L 5/46* (2013.01); *F26B 3/02* (2013.01); *F26B 5/14* (2013.01); *C10L 2290/02* (2013.01); *C10L 2290/06* (2013.01); *C10L 2290/08* (2013.01); *C10L 2290/547* (2013.01); *F26B 2200/02* (2013.01); *F26B 2200/18* (2013.01); *Y02E 50/10* (2013.01); *Y02E 50/30* (2013.01)

(56) References Cited

U.S. PATENT DOCUMENTS

| | | | | |
|---|---|---|---|---|
| 8,832,962 | B2* | 9/2014 | Pardo | F26B 23/002 |
| | | | | 34/304 |
| 8,857,074 | B2* | 10/2014 | Bernon | B27K 5/0085 |
| | | | | 110/216 |
| 9,963,370 | B2* | 5/2018 | Stradi | B30B 9/121 |
| 9,989,310 | B2* | 6/2018 | Knight, Jr. | F26B 25/007 |
| 2014/0141381 | A1* | 5/2014 | Bullinger | C10L 9/08 |
| | | | | 432/29 |
| 2015/0345864 | A1* | 12/2015 | Bae | F26B 23/002 |
| | | | | 34/380 |
| 2016/0052815 | A1 | 2/2016 | Pardo et al. | |
| 2016/0194230 | A1 | 7/2016 | Pardo et al. | |

\* cited by examiner

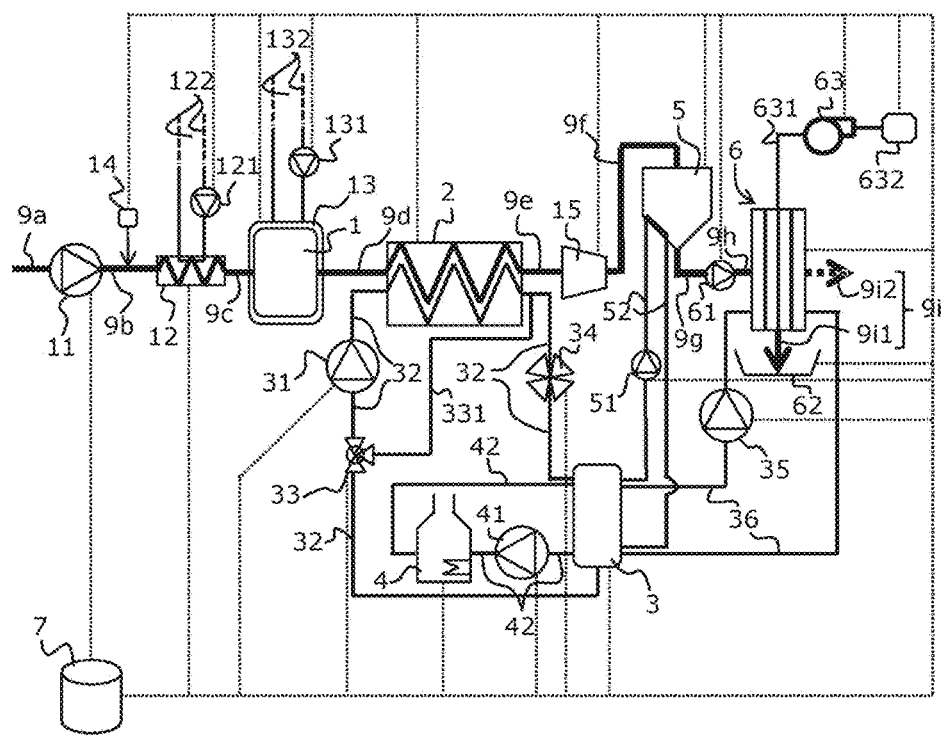

METHOD AND FACILITY FOR DRYING BY MEANS OF HYDROTHERMAL CARBONIZATION AND FILTERING

TECHNICAL FIELD

The present invention relates to the field of heat treatment of a product to be dehydrated, such as the sludge obtained from a waste water treatment system.

More particularly, the present invention concerns a method for drying a product of this type by hydrothermal carbonization and filtering.

The present invention also concerns a drying installation for implementation of a method of this type.

PRIOR ART

A drying method is known in the prior art which combines a hydrothermal carbonization operation and a filtering operation.

Document WO 2015/008219 A1 describes an installation comprising a reactor and a filtering medium mounted in series. A product to be dehydrated of the sludge treatment type can be introduced into the reactor, and is maintained under pressure there at a temperature close to 200° C., so as to carry out the said hydrothermal carbonization operation. In this installation, the carbonized product output from the reactor is then cooled, decompressed, then filtered.

A disadvantage of this type of installation and method is that they do not make it possible to dry a product to be dehydrated to a dryness value which permits optimum thermal recovery of this product, typically dryness of 90%.

An objective of the present invention is to propose a drying method and installation which optimize the energy consumption, whilst being able to dry a product to be dehydrated to a dryness value of between 50 and 95% according to the final needs.

SUMMARY OF THE INVENTION

This objective is achieved with a method for drying a product to be dehydrated, comprising displacement of the product to be dehydrated on an industrial treatment course, said course comprising a reactor and a heat exchanger, the course additionally comprising a mechanical compression system,
the method comprising:
  a step of thermal conditioning of the hydrothermal carbonization type, during which the product to be dehydrated is maintained in the reactor at a carbonization pressure P0, preferably of between 0.6 and 3.5 MPa, and at a carbonization temperature T0, preferably of between 140 and 300° C.;
  a step of transfer of heat, during which, by means of the heat exchanger, transfer takes place to a heat transfer fluid, for example water, of at least part of the heat contained in the product to be dehydrated which has been subjected to the thermal conditioning step;
  a step of mechanical dehydration during which:
    the product to be dehydrated which has been subjected to the thermal conditioning step and the step of transfer of heat is introduced into the mechanical compression system;
    the product to be dehydrated contained in the mechanical compression system is compressed by application of a dehydration pressure P1, preferably of more than 0.5 MPa; and
    a liquid fraction of the product to be dehydrated is discharged, the liquid fraction being separated from the product to be dehydrated under the effect of its compression; and
  a heating step, during which transfer takes place to the product to be dehydrated of at least part of the heat contained in the heat transfer fluid which has been subjected to the step of transfer of heat, this heating step being carried out simultaneously with, or after, the mechanical dehydration step.

Preferably, the mechanical compression system is a heating filter press comprising at least two plates, and:
  during the step of mechanical dehydration, the compression of the product to be dehydrated is carried out against at least one of said plates; and
  during the heating step, the heat transfer fluid which has been subjected to the step of transfer of heat is circulated in channels formed in at least one of said plates, this at least one of said plates preferably corresponding to the at least one of said plates against which the product to be dehydrated is compressed.

A drying method of this type makes it possible to recuperate energy discharged by the heat exchanger, and to use this recuperated heat to dry the product to be dehydrated in the heating filter press. In methods known in the prior art, as represented by document WO 2015/008219 A1, this energy discharged is wasted. Consequently, the present invention makes it possible to optimize the energy consumption by reusing this energy discharged.

In addition, the use of a heating filter press is particularly advantageous for drying a carbonized product, i.e. a product which has been subjected to a thermal conditioning step of the hydrothermal carbonization type.

In fact, drying by means of a heating filter press in general gives rise to difficulties in terms of:
  transfer of heat from the heating plate(s) to the product to be dehydrated contained in the heating filter press; and
  discharge of the water vapor generated in the heating filter press during drying of this type.

When the dehydrated product is a treatment sludge which enters the heating filter press with dryness of 20%, the heating time required to obtain dryness of 90% can be extremely lengthy, and typically twelve hours. Thus, the dimensions of a heating filter press are dependent more on its drying function than on its filtration function. This results in relatively rare implementation of the drying by means of a heating filter press.

However, when the quantity of water to be evaporated is low, this phenomenon is minimized. In this respect, it is advantageous to implement a heating filter press in order to dry a carbonized product during a prior step of hydrothermal carbonization, with the carbonized product introduced into the heating filter press being able to have dryness of between 50 and 65%.

The thermal consumption of a heating filter press is approximately 1000 kWh/tEE in order to dry a sludge with approximately 20% dryness, approximately 15% of which comes from the heating step itself. In the present method, it is estimated that the consumption in order to dry a sludge with approximately 65% dryness is approximately 363 kWH/tMS. By estimating available energy at the output of the reactor (temperature of the carbonized product) of 175-350 kWh/tMS, it is possible to cover the energy requirements in order to carry out the heating step.

Preferably, the product to be dehydrated is a treatment sludge obtained from processing of waste water.

Advantageously, the step of transfer of heat can be carried out by circulating:

the heat transfer fluid as well as the product to be dehydrated in the heat exchanger; and the heat transfer fluid in a circulation loop which is preferably closed, passing via the heat exchanger, with the heat transfer fluid being circulated in the circulation loop by control of a circulation pump, and the circulation pump and/or the heat exchanger can be controlled in order to lower the temperature of the product to be dehydrated to a filtration temperature T1 which is preferably lower than 90° C., and preferably between 50 and 70° C.

Firstly, a filtration temperature T1 of this type is compatible with certain heating filter press technologies, and in particular with the membrane materials of membrane heating filter presses.

Secondly, a filtration temperature T1 of this type optimizes the filtering capacity of the heating filter press and the energy consumption of this equipment.

According to an advantageous characteristic, it is possible to store in a balloon at least part of the heat transfer fluid which has been subjected to the step of transfer of heat, and the heat transfer fluid used during the heating step is at least partly collected from this balloon.

A balloon of this type makes it possible to store at least part of the heat required in order to carry out the heating step with the heating filter press.

Storage of this type is particularly advantageous, taking into account the nature of the hydrothermal carbonization operation, which can be continuous or discontinuous, and the discontinuous nature of the functioning of the heating filter press.

According to another advantageous characteristic, it is possible to heat the heat transfer fluid before it is used in the heating step by means of an additional source of heat, for example a boiler.

An additional source of heat of this type makes it possible to complete the requirement of the heating filter press to carry out the heating step, according to the size of the balloon.

Advantageously, during the mechanical dehydration step, it is possible to put under depression an inner space of the mechanical compression system which receives the product to be dehydrated, and the gases or vapors thus extracted can be channeled to a steam treatment system.

A method of this type thus makes it possible to control the odors emitted by implementation of the heating filter press, in particular when the product to be dehydrated is a treatment sludge.

According to yet another advantageous characteristic, a heating time D0 is preferably parameterized, with the heating time D0 corresponding to the duration of implementation of the heating step, such that the dryness of the product to be dehydrated contained in the mechanical compression system reaches or exceeds a final dryness Sf, preferably of between 50 and 95%, at the end of this heating step.

A characteristic of this type makes it possible to dry the product to be dehydrated according to the final requirements, and thus to optimize the energy consumption of the method.

The present invention also concerns a drying installation comprising:

a reactor which is designed to store the product to be dehydrated and to maintain it at carbonization pressure P0, preferably of between 0.6 and 3.5 MPa, and at a carbonization temperature T0, preferably of between 140 and 300° C.; and a heat exchanger which is designed to transfer to a heat transfer fluid at least part of the heat contained in the product to be dehydrated output from the reactor, characterized in that it additionally comprises:

a mechanical compression system comprising:

an inner space which is designed to receive the product to be dehydrated;

a means for compression, for example a membrane, which can compress the product to be dehydrated contained in the mechanical compression system;

a filtrate discharge outlet, which is designed to discharge a liquid fraction of the product to be dehydrated during its compression;

heating means which are designed to transfer to the product to be dehydrated, inside the mechanical compression system or downstream from the mechanical compression system, at least part of the heat contained in the heat transfer fluid obtained from the heat exchanger.

Preferably, the mechanical compression system is a heating filter press comprising at least two plates, the compression means being designed to compress the product to be dehydrated contained in the heating filter press against at least one of said plates, and at least one of said plates comprises channels which can receive a heating liquid, the installation being designed such that this heating liquid is constituted at least partly by the heat transfer fluid obtained from the heat exchanger, the heating means comprising said channels.

According to an advantageous characteristic, the installation can also comprise an additional source of heat which can heat the heat transfer fluid before it reaches the heating means.

According to another advantageous characteristic, the installation can also comprise a balloon which is designed to store at least partly the heat transfer fluid output from the heat exchanger, upstream from the mechanical compression system.

The above-described advantages also apply to an installation of this type.

DESCRIPTION OF THE FIGURES AND EMBODIMENTS

Other advantages and particular features of the invention will become apparent from reading the detailed description of implementations and embodiments which are in no way limiting, and from the appended FIG. 1, which is a schematic view of a drying installation according to the invention.

Since the embodiments described hereinafter are in no way limiting, it will be possible in particular to take into consideration variants of the invention which comprise only a selection of characteristics described, isolated from the other characteristics described (even if this selection is isolated within a phrase comprising these other characteristics), if this selection of characteristics is sufficient to provide a technical advantage or to differentiate the invention from the prior art. This selection comprises at least one characteristic, which is preferably functional without structural details, or with only part of the structural details, if this part alone is sufficient to provide a technical advantage, or to differentiate the invention from the prior art.

FIG. 1 illustrates a preferred embodiment of the invention.

According to this embodiment, the installation comprises an industrial treatment course inside which a product to be dehydrated is displaced, for example treatment sludge.

Product to be dehydrated preferably means a paste or liquid product, and preferably a sludge.

Dehydration of the product means the (partial or total) removal or elimination of the water from this product by any means.

In the following description, the term "sludge" can be replaced by "product to be dehydrated".

This course comprises different elements for piping the sludge or ducts 9a-9i, as well as different apparatuses or devices which are connected to one another by these ducts 9a-9i.

Via the duct 9a, and with dryness of for example between 4 and 25%, the sludge reaches a pump 11 which pressurizes the sludge. The outlet of the pump 11 is connected to a heating means 12 by the duct 9b.

The heating means 12 is of a type which can heat the sludge by direct or indirect transfer of heat upstream from, or inside, a reactor 1, inside which a step of thermal conditioning is carried out (which is typically a hydrothermal carbonization operation). This heating means 12 can carry out transfer of heat by means of a hot thermal fluid, for example oil, steam or superheated water, or by means of direct injection of different types of steam.

In the example in FIG. 1, this heating means 12 heats the sludge by heat transfer with a hot thermal fluid, for example oil, which is circulated in the loop 122 by a pump 121. This heating means 12 is preferably a pipe exchanger, in which the sludge and the thermal fluid are circulated with counter-current flows.

The heating means 12 is connected to the reactor 1 by the duct 9c.

Preferably, an additive is injected into the sludge by any appropriate injection means 14. The additive can consist of any catalyst which can break down the organic material, for example an acid such as sulfuric acid. The injection of additive can take place upstream from the reactor 1, or inside it.

The reactor 1 is designed to store the sludge and maintain it at a carbonization pressure P0 which is typically between 0.6 and 3.5 MPa, and at a carbonization temperature T0 which is typically between 140 and 300° C.

In a preferred embodiment, the sole function of the reactor 1 is to ensure a residence time which makes it possible to subject the sludge to chemical reactions, and typically hydrolysis. Thus, the reactor 1 can alternatively be in the form of a chamber which does or does not have baffles or pipes, or for example in the form of a pipe with a length which is sufficient to ensure the residence time required. It can be mixed or not mixed, and can function in batch form or continuously.

The reactor 1 is preferably surrounded by an envelope forming a double wall in which a hot fluid circulates, typically oil, in order to heat, or maintain the temperature of, the sludge contained in the reactor 1. The hot fluid is for example circulated in the double wall by means of a pump 131 mounted on a loop 132 connected to the double wall.

Alternatively, injection of steam can also make it possible to maintain the temperature or pressure of the reactor 1.

The means for pressurization of the sludge, heating of the sludge, maintenance of its temperature and decompression of it can have any standard configuration.

In particular, the thermal conditioning step can be carried out in different vessels functioning in parallel.

The sludge which is carbonized, i.e. which has been subjected to a hydrothermal carbonization operation whilst being contained in the reactor 1, at the carbonization pressure P0 and temperature T0, is conveyed by the duct 9d to a heat exchanger 2. Typically, the temperature of the carbonized sludge at the outlet of the reactor 1 is more than 100° C., for example between 100 and 120° C.

At the outlet of the reactor 1, and upstream from the heat exchanger 2, an additional exchanger (not illustrated) can be implemented in order to recuperate the heat contained in the sludge, for the requirements of the hydrothermal carbonization process.

The heat exchanger 2 is designed to transfer to a heat transfer fluid, this heat transfer fluid preferably being water, at least part of the heat contained in the sludge obtained from the reactor 1, in order to carry out a step of transfer of heat.

The heat transfer fluid is circulated by a circulation pump 31 in a circulation loop 32 which passes via the heat exchanger 2.

The circulation loop 32 also passes via a balloon 3, such that at least part of the heat transfer fluid obtained from the heat exchanger 2, heated by transfer of heat with the sludge obtained from the reactor 1, is stored in the balloon 3. Preferably, the circulation loop 32 is designed such that the heat transfer fluid output from the balloon 3 and going to the heat exchanger 2 is taken from the low part of the balloon 3, and such that the heat transfer fluid obtained from the heat exchanger 2 is injected into the balloon 3 in the high part (high and low being defined in the present description such that a direction going from top to bottom is parallel to the gravitational attraction of the Earth). Thus, the heated fraction of heat transfer fluid which reaches the heat exchanger 2 progressively heats the heat transfer fluid which is in the balloon 3 from top to bottom.

The balloon 3 has dimensions suitable for storing the heat corresponding to the heating requirement of a heating filter press 6 mounted downstream from the heat exchanger 2 (see hereinafter).

The balloon 3 is preferably designed to store heat by means of an increase in its mean temperature, and not by an increase in its volume. In particular, the temperature at the high part of the balloon 3 can fluctuate between 60 and 120° C., and the mean temperature can fluctuate between 50 and 100° C., which makes possible large storage of heat.

Preferably, the circulation pump 31 and/or the heat exchanger 2 are controlled so as to lower the temperature of the sludge output from the heat exchanger 2 to a filtration temperature T1 which is preferably lower than 90° C., and preferably between 50 and 70° C. For this purpose, it is possible for example to:

control the speed of the circulation pump 31; and/or
    control the heat exchanger 2 by carrying out the following steps:
        collecting part of the heat transfer fluid output from the heat exchanger 2; and
        reintroducing it upstream from the heat exchanger 2 (preferably upstream from the circulation pump 31) by means of a three-way valve 33, this collected part being conveyed through the valve 33 via an appended circuit 331.

Preferably, the heat transfer fluid circulates in the heat exchanger 2 with counter-current flow of the sludge (as the inverse of what is illustrated in FIG. 1).

Preferably, for reasons of safety, an air capacitor 34 is installed on the circulation loop 32, in order to ensure the cooling of the heat exchanger 2 in the case of non-use of the heating filter press 6.

The sludge output from the heat exchanger 2 reaches a decompression tool 15 via the duct 9e. Alternatively, the decompression tool 15 can be placed upstream from the heat exchanger 2.

In the embodiment in FIG. 1, the sludge output from the decompression tool 15 reaches a storage vessel 5 via the duct 9f. The decompression tool 15, for example a valve, allows the sludge to be conveyed to the storage vessel 5 without vaporization.

According to an advantageous embodiment, a loop 52 connects the balloon 3 and the storage vessel 5. This loop 52 is designed to circulate a fraction of the heat transfer fluid, by means of a pump 51, between the balloon 3 and the storage vessel 5, in a closed-circuit, in order to maintain the temperature of the sludge which is in the storage tank 5. Advantageously, this fraction of heat transfer fluid is collected from the high part and reintroduced into the low part of the balloon 3.

Via the duct 9g, a pump 61 collects the sludge which is in the storage vessel 5, in order to introduce it under pressure into the heating filter press 6.

The heating filter press 6 is of a type which can carry out a step of mechanical dehydration and a step of heating of the sludge.

The heating filter press 6 comprises at least two plates placed against one another, and an inner space which is designed to receive the sludge. The inner space is formed for example by one or a plurality of filtration chambers formed in one or a plurality of plates, for example in the form of hollows. An example of plates is described in document WO 2004/024290 A1.

In order to carry out the step of mechanical dehydration, the heating filter press 6 comprises a compression means which can compress the sludge contained in the heating filter press 6 against at least one of said plates. This compression means is preferably a membrane, which is either integrated with a plate (the membrane then being made of polypropylene for example), or secured on a plate (the membrane then being made of rubber for example). Preferably, the heating filter press 6 comprises a plurality of pairs of plates, with a plate of each pair comprising a membrane, and the other plate of each pair comprising a filtration chamber. The compression as such is preferably carried out by pressurizing or inflating the membrane(s), for example with compressed air or water under dehydration pressure P1, preferably at more than 0.5 MPa, and typically at 1.5 MPa.

A compression means of this type is advantageous, since it makes it possible to apply a regular pressure on the sludge contained in the inner space of the heating filter press 6.

The mechanical dehydration step typically comprises:
supply of sludge to the heating filter press 6 by the pump 61, for example with a supply pressure of 0.6 or 0.7 MPa; a piston maintains the plates clamped against one another;
preforming of the sludge (which is known as a cake in this step) in the inner space of the heating filter press 6 at this supply pressure;
stoppage of the pumping and inflation of the membranes, for example for a time of between 15 and 45 minutes; during this compression step, firstly a liquid fraction of the sludge, known as the filtrate, is discharged via a filtrate discharge outlet 9i2, the liquid fraction being separated from the sludge under the effect of its compression, and secondly the sludge is compressed against at least one plate, the at least one plate preferably comprising a filtration chamber.

During the step of mechanical dehydration, the inner space of the heating filter press 6 which receives the sludge is put under depression, for example by activating a fan 63, and the gases or vapors thus extracted are channeled via a duct 631 to a steam treatment system 632.

One or a plurality of plates of the heating filter press 6, in particular the plate(s) comprising a filtration chamber, comprise(s) channels which can receive a heating liquid.

Preferably, the installation is designed such that this heating liquid is constituted at least partly by the heat transfer fluid obtained from the heat exchanger 2, and preferably obtained from the balloon 3. For this purpose the heat transfer fluid is circulated by means of a pump 35 in a loop 36, which connects the balloon 3 and the channels in a closed loop. As illustrated in FIG. 1, the heat transfer fluid thus introduced into the channels is preferably collected in the high part of the balloon 3, and the heat transfer fluid which is output from the heating filter press 6 is preferably reintroduced into the low part of the balloon 3.

These arrangements make it possible to carry out a heating step during which the heat transfer fluid is circulated in the channels.

Since the implementation of the hydrothermal carbonization operation can be discontinuous, in particular when it is carried out in batch form, and since the availability of the heated heat transfer fluid during the step of transfer of heat can consequently be insufficient to carry out the heating step, the installation preferably comprises an additional source of heat 4 which can heat the heat transfer fluid before it reaches the heating filter press 6. Thus, if necessary, the heat transfer fluid is heated before it is put into circulation in the channels by means of an additional source of heat 4 of this type.

This additional source of heat 4 is preferably a boiler, which is preferably mounted on a loop 42 mounted on the balloon 3 such as to:
collect from the balloon 3, preferably in the low part, a fraction of the heat transfer fluid contained in the balloon 3, by activation of a pump 41;
heat the fraction of heat transfer fluid which is circulating in the loop 42, by means of the additional source of heat 4; and
reintroduce into the balloon 3 this fraction of heat transfer fluid thus heated, preferably in the high part.

Advantageously, a heating time D0 is parameterized, with the heating time D0 corresponding to the duration of implementation of the heating step, such that the dryness of the product to be dehydrated contained in the heating filter press 6 reaches or exceeds a final dryness Sf, preferably of between 50 and 95%, at the end of this heating step.

When the steps of mechanical dehydration and heating are completed, the dehydrated sludge contained in the heating filter press 6, i.e. the sludge which has been subjected to these steps, is discharged from the heating filter press 6 via a removal outlet 9i1 to a collection system 62.

With reference to the heating filter press 6 and the implementation of the mechanical dehydration and heating steps, the means for pressurizing, filtering, heating, applying depression, collecting the dehydrated sludge, and treating the gases or vapors can have any standard configuration. Thus, the heating filter press 6 implemented in this installation can be of any known type, for example of the type described in document WO 98/25684.

The control of the different apparatuses or devices described above is ensured by any appropriate control unit 7, such as a central computer unit or an electronic console provided with separate control means for each type of apparatus or device, such as pumps, valves, reactor (for example temperature, pressure), fan (for example output), etc. (control of this type being represented by broken lines in FIG. 1).

In an embodiment not illustrated, the heating filter press 6 is replaced by a mechanical compression system such as a simple filter press (not illustrated), or by a piston press, the outlet of which is directed to heating means such as a low-temperature dryer (not illustrated, and preferably situated downstream from the filter press). This low-temperature dryer can be of the belt type, for example as sold by the company STC. A belt dryer of this type makes it possible to dry sludge with a low-temperature source of heat, typically lower than 90° C. An installation according to an embodiment of this type makes it possible to heat the sludge inside a low-temperature dryer of this type by transferring heat recuperated (preferably by the heat exchanger 2) to the sludge which has undergone the thermal conditioning step.

Of course, the invention is not limited to the above-described examples, and numerous adjustments can be made to these examples without departing from the context of the invention. In addition, the different characteristics, forms, variants and embodiments of the invention can be associated with one another according to various combinations, provided that they are not incompatible, or exclusive relative to one another.

The invention claimed is:

1. A method for drying a product to be dehydrated, comprising displacement of the product to be dehydrated on an industrial treatment course (9a-9i, 11, 12, 1, 2, 15, 5, 61, 6), said course comprising a reactor (1) and a heat exchanger (2),
    wherein the course additionally comprises a mechanical compression system (6),
    and wherein this method comprises:
        a step of thermal conditioning, during which the product to be dehydrated is maintained in the reactor (1) at a carbonization pressure P0, and at a carbonization temperature T0,
        a step of transfer of heat, during which, by means of the heat exchanger (2), transfer takes place to a heat transfer fluid of at least part of the heat contained in the product to be dehydrated which has been subjected to the thermal conditioning step;
        a step of mechanical dehydration during which:
        the product to be dehydrated which has been subjected to the thermal conditioning step and the step of transfer of heat is introduced into the mechanical compression system (6);
        the product to be dehydrated contained in the mechanical compression system (6) is compressed by application of a dehydration pressure P1; and
        a liquid fraction of the product to be dehydrated is discharged, the liquid fraction being separated from the product to be dehydrated under the effect of its compression;
    and
        a heating step, during which transfer takes place to the product to be dehydrated of at least part of the heat contained in the heat transfer fluid which has been subjected to the step of transfer of heat, this heating step being carried out simultaneously with, or after, the mechanical dehydration step.

2. The method as claimed in claim 1, wherein the product to be dehydrated is a treatment sludge obtained from processing of waste water.

3. The method as claimed in claim 2, wherein the mechanical compression system (6) is a heating filter press comprising at least two plates, and wherein:
    during the step of mechanical dehydration, the compression of the product to be dehydrated is carried out against at least one of said plates; and
    during the heating step, the heat transfer fluid which has been subjected to the step of transfer of heat is circulated in channels formed in at least one of said plates.

4. The method as claimed in claim 2, wherein the step of transfer of heat is carried out by circulating:
    the heat transfer fluid as well as the product to be dehydrated in the heat exchanger (2); and
    the heat transfer fluid in a circulation loop (32) passing via the heat exchanger (2), with the heat transfer fluid being circulated in the circulation loop (32) by control of a circulation pump (31),
    and wherein the circulation pump (31) and/or the heat exchanger (2) are controlled in order to lower the temperature of the product to be dehydrated to a filtration temperature T1.

5. The method as claimed in claim 1, wherein the mechanical compression system (6) is a heating filter press comprising at least two plates, and wherein:
    during the step of mechanical dehydration, the compression of the product to be dehydrated is carried out against at least one of said plates; and
    during the heating step, the heat transfer fluid which has been subjected to the step of transfer of heat is circulated in channels formed in at least one of said plates.

6. The method as claimed in claim 5, wherein the step of transfer of heat is carried out by circulating:
    the heat transfer fluid as well as the product to be dehydrated in the heat exchanger (2); and
    the heat transfer fluid in a circulation loop (32) passing via the heat exchanger (2), with the heat transfer fluid being circulated in the circulation loop (32) by control of a circulation pump (31),
    and wherein the circulation pump (31) and/or the heat exchanger (2) are controlled in order to lower the temperature of the product to be dehydrated to a filtration temperature T1.

7. The method as claimed in claim 1, wherein the step of transfer of heat is carried out by circulating:
    the heat transfer fluid as well as the product to be dehydrated in the heat exchanger (2); and
    the heat transfer fluid in a circulation loop (32) passing via the heat exchanger (2), with the heat transfer fluid being circulated in the circulation loop (32) by control of a circulation pump (31),
    and wherein the circulation pump (31) and/or the heat exchanger (2) are controlled in order to lower the temperature of the product to be dehydrated to a filtration temperature T1.

8. The method of claim 7, wherein T1 is lower than 90° C.

9. The method of claim 7, wherein T1 is between 50 and 70° C.

10. The method as claimed in claim 1, wherein storage takes place in a balloon (3) of at least part of the heat transfer fluid which has been subjected to the step of transfer of heat, and wherein the heat transfer fluid used during the heating step is at least partly collected from this balloon (3).

11. The method as claimed in claim 1, wherein the heat transfer fluid is heated before it is used in the heating step by means of an additional source of heat (4).

12. The method as claimed in claim 1, wherein, during the mechanical dehydration step, an inner space of the mechanical compression system (6) which receives the product to be dehydrated is put under depression, and wherein the gases or vapors thus extracted are channeled to a steam treatment system (632).

13. The method as claimed in claim 1, wherein a heating time D0 is parameterized, with the heating time D0 corresponding to the duration of implementation of the heating step, such that the dryness of the product to be dehydrated contained in the mechanical compression system (6) reaches or exceeds a final dryness Sf, between 50 and 95%, at the end of this heating step.

14. The method of claim 1, wherein P0 is between 0.6 and 3.5 MPa.

15. The method of claim 1, wherein T0 is between 140 and 300° C.

16. The method of claim 1, wherein P1 is greater than 0.5 MPa.

17. A drying installation comprising:
a reactor (1) which is designed to store the product to be dehydrated and to maintain it at a carbonization pressure P0, of between 0.6 and 3.5 MPa, and at a carbonization temperature T0, of between 140 and 300° C.;
a heat exchanger (2) which is designed to transfer to a heat transfer fluid at least part of the heat contained in the product to be dehydrated output from the reactor (1),
a mechanical compression system (6) comprising:
an inner space which is designed to receive the product to be dehydrated;
a means for compression which can compress the product to be dehydrated contained in the mechanical compression system (6);
a filtrate discharge outlet (9i2), which is designed to discharge a liquid fraction of the product to be dehydrated during its compression;
heating means which are designed to transfer to the product to be dehydrated, inside the mechanical compression system (6) or downstream from the mechanical compression system (6), at least part of the heat contained in the heat transfer fluid obtained from the heat exchanger (2).

18. The installation as claimed in claim 17, wherein the mechanical compression system (6) is a heating filter press comprising at least two plates, the compression means being designed to compress the product to be dehydrated contained in the heating filter press (6) against at least one of said plates,
and in that at least one of said plates comprises channels which can receive a heating liquid, the installation being designed such that this heating liquid is constituted at least partly by the heat transfer fluid obtained from the heat exchanger (2), the heating means comprising said channels.

19. The installation as claimed in claim 17, further comprising an additional source of heat (4) which can heat the heat transfer fluid before it reaches the heating means.

20. The installation as claimed in claim 17, further comprising a balloon (3) which is designed to store at least partly the heat transfer fluid output from the heat exchanger (2), upstream from the mechanical compression system (6).

* * * * *